United States Patent [19]

Tidwell

[11] 3,865,291

[45] Feb. 11, 1975

[54] SPARE TIRE HOLDER

[76] Inventor: Richard Wm. Tidwell, 4308 Mackey Ave., St. Louis Park, Minn. 55424

[22] Filed: Mar. 20, 1973

[21] Appl. No.: 343,168

[52] U.S. Cl. .................. 224/42.24, 224/42.46 R
[51] Int. Cl. ............................................. B62d 43/02
[58] Field of Search ........... 224/42.24, 42.21, 42.12, 224/42.13, 42.2, 42.23, 42.25, 42.46 R, 42.46 A, 42.46 B, 42.06, 42.45 R

[56] References Cited
UNITED STATES PATENTS

| 1,696,853 | 12/1928 | Ludwig | 224/42.21 X |
|---|---|---|---|
| 1,926,350 | 9/1933 | Olson | 224/42.21 |
| 2,772,826 | 12/1956 | Krengle | 224/42.24 |
| 3,349,977 | 10/1967 | Caminiti | 224/42.24 X |
| 3,362,597 | 1/1968 | Beach | 224/42.21 |
| 3,688,954 | 9/1972 | Neal | 224/42.24 |

Primary Examiner—Robert J. Spar
Assistant Examiner—Jerold M. Forsberg

[57] ABSTRACT

Several embodiments are disclosed of a detachable spare tire holder for mounting a spare tire on one of the box side walls of a pickup truck. Each embodiment includes an elongated spine provided with a clamp for clamping its upper end to the top of the box side wall. The adjustable parts of these clamps are so located as to not interfere with the mounting of a camper in the box of the pickup truck. Wheel securing arrangements are disclosed for securing several sizes and styles of truck wheel to the elongated spines of these embodiments.

4 Claims, 9 Drawing Figures

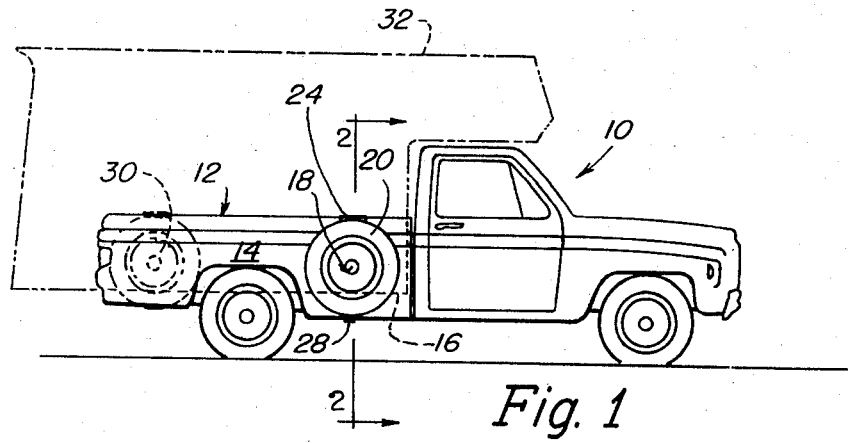
Fig. 1
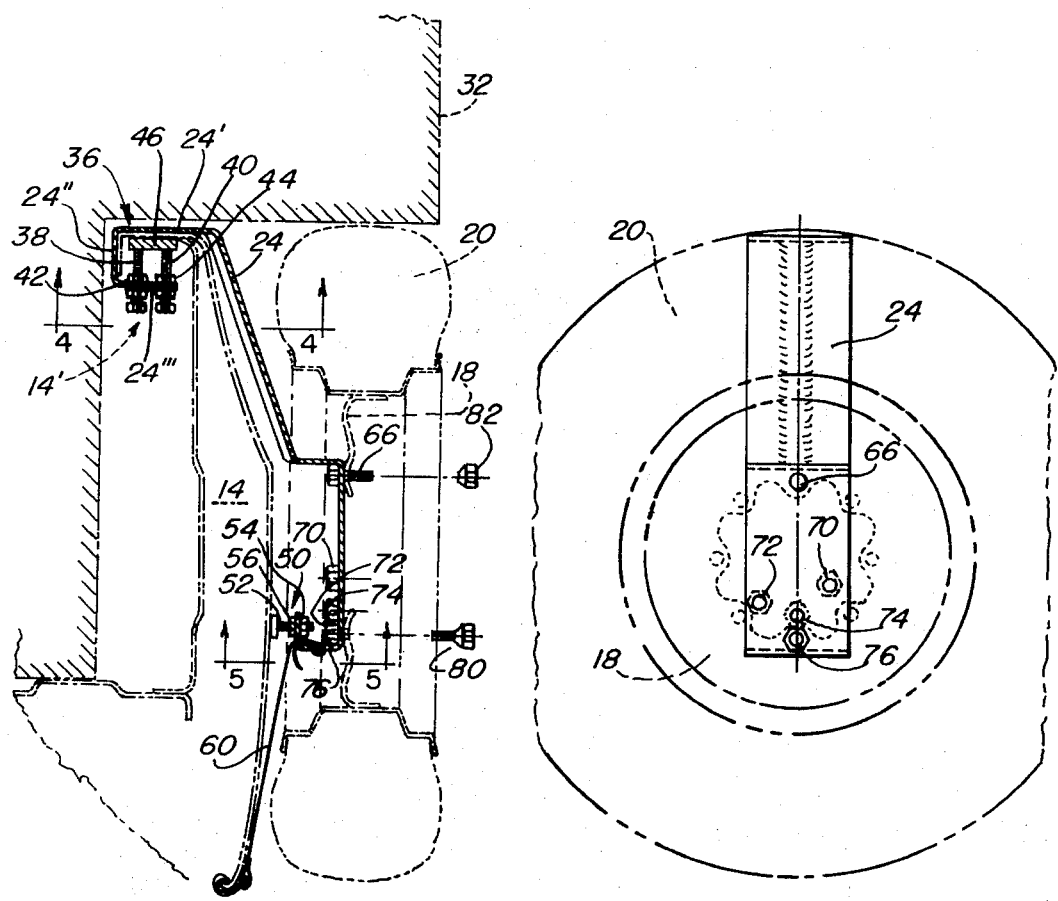
Fig. 2
Fig. 3

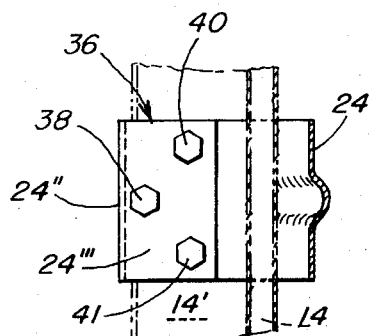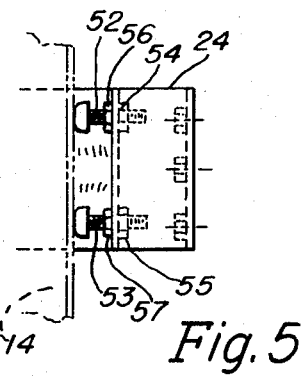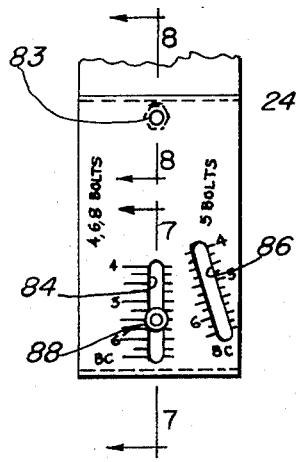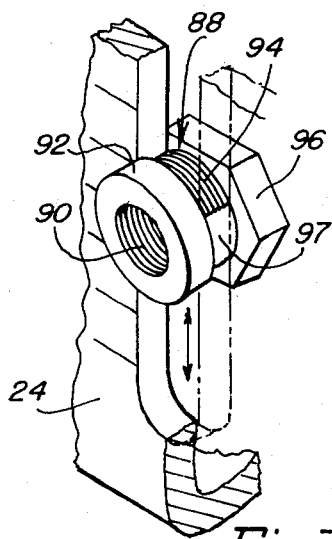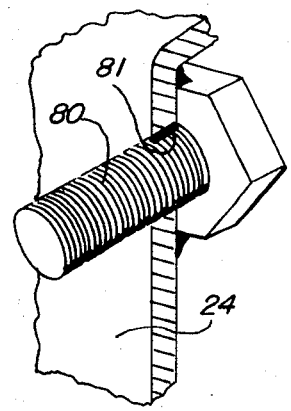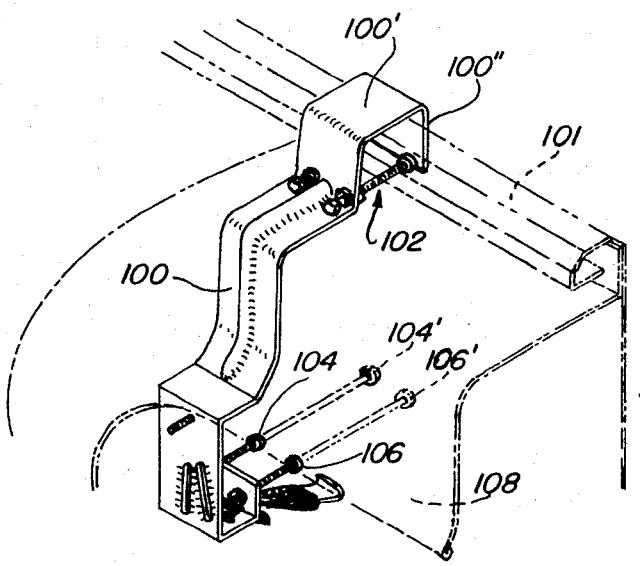

SPARE TIRE HOLDER

BACKGROUND OF THE INVENTION

My invention relates to detachable spare tire holders for mounting spare tires on the box side walls of pickup trucks, and more particularly to improved spare tire holders which maximize the number of spare tires which can be mounted on the box side walls of one pickup truck, and which minimize interference with the mounting of a camper in the box of the pickup truck.

It is known in the prior art to attach a spare tire holder frame to the top of a box side wall of a pickup truck by means of two attaching devices located at the opposite ends of a horizontal frame member, the frame member being about one tire diameter in length and lying upon the top of the box side wall. Since the horizontal frame member and the two attaching devices must be located on the top of the box side wall in such a way as to avoid camper tie-down brackets, turnbuckles, and the like, and also to avoid covering fuel filler pipes, safety side lights, and the like with the spare tire or the frame, such prior art mounting arrangements seriously restrict the number of spare tire mounting positions, and in some cases permit of mounting but one spare tire, on each side of a pickup truck.

Spare tire mounting devices of this general class, found in the prior art, in which the attaching means and part of the tire holding means lie upon the top of the box side wall of the pickup truck, also interfere with the mounting in the box of campers whose overhang closely overlies the box side walls.

Further, certain prior art detachable spare tire holders for pickup trucks are limited in the range of wheel styles and sizes which their wheel securing means can accommodate, thus limiting the number of different makes of pickup truck on which these prior art spare tire holders can be mounted, or multiplying the number of variant models which a dealer must keep in stock.

SUMMARY OF THE INVENTION

Accordingly, it is an object of my invention to provide an improved detachable spare tire holder for mounting spare tires on the box side walls of pickup trucks without puncturing said side walls.

It is another object of my invention to provide a spare tire holder of this general class which overlies only a small part of the box side wall, thus minimizing interference with camper tie-down brackets, turnbuckles, and the like, and, consequently, maximizing the number of possible tire mounting positions, and, in some cases, making it possible to mount two tires on each side of a pickup truck, e.g., a complete set of four snow tires.

It is yet another object of my invention to provide an improved spare tire holder of this general class in which only a single, flat structural part of the holder lies upon the box side wall, and against the inner face of the box side wall rim, thus minimizing interference with the mounting of a camper in the box, and maximizing the number of makes and styles of camper which can be mounted in the box of a particular pickup truck equipped with the device of my invention.

It is a further object of my invention to provide an improved spare tire holding device of this general class in which the adjustable part of the clamping means which clamps the upper end of the device to the top of the box side wall is so located as to avoid interference with the mounting of a camper in the box.

Yet another object of my invention is to provide an improved spare tire holding device of this general class in which the means for securing the wheel carrying the spare tire to the main body of the device is capable of securing a wide variety of different wheels having different bolt circle diameters and different numbers of bolt holes to the device without the use of unattached special parts which can be easily lost and thus are unavailable when needed.

In accordance with a principal feature of my invention, the spare tire holder of my invention has as its main body member an elongated spine capable of bearing the weight of a truck wheel and tire. The width of this elongated spine is, in accordance with my invention, considerably less than the diameter of a truck tire of the commonly used type. In preferred embodiments of my invention, the width of this elongated spine is less than the diameter of the smallest size of pickup truck wheel, and may be approximately equal to the bolt circle diameter of the smallest size of pickup truck wheel. Due to the narrowness of the spine, and the portions thereof which pass over the box side wall of the associated pickup truck, the number of possible tire mounting positions is increased, and it is made possible to mount four spare tires on the side walls of pickup truck boxes which otherwise could carry but two spare tires.

In accordance with another aspect of my invention, the clamping means for clamping the upper portion of said spine to the top of the box side wall of a pickup truck includes a first portion of the spine which closely overlies or adjoins the top of the side wall and a second portion of the spine which lies close to or adjoins the inner face of the rim of the box side wall.

In accordance with yet another aspect of my invention, the adjustable part of said clamping means lies entirely within the smaller dihedral angle formed by said first and second portions of the spine. That is to say, the adjustable part of the clamping means either lies outside of the truck body or within the truck body but beneath the rim of the box portion, and thus presents the minimum possible interference to the mounting of a camper in the box portion of the truck.

In accordance with a further feature of my invention, the wheel securing means for securing a truck wheel to said spine include a single threaded stud affixed to the spine, upon which a truck wheel and tire may be initially disposed while being mounted on the spare tire holder of my invention, and a plurality of threaded openings adapted to receive a bolt passing through one of the other mounting bolt holes of the wheel being mounted, said threaded openings being so located with respect to the threaded stud as to be able to receive bolts passing through bolt holes of different wheels having different numbers of bolt holes and different bolt circle diameters when such different wheels are hung on the threaded stud.

In accordance with another feature of my invention, alternative wheel securing means may be provided in which said threaded openings are replaced by two slots lying on lines intersecting at said threaded stud, and an interiorly and exteriorly threaded sleeve, headed and provided with a nut to retain it in either one of said slots; the interior threads of said sleeve being adapted to receive a bolt passing through one of the mounting bolt holes of a wheel hung on said threaded stud.

Other objects, aspects, and features of my invention will in part be obvious and will in part appear hereinafter.

My invention, accordingly, comprises the features of construction, combinations of elements, and arrangements of parts which will be exemplified in the constructions hereinafter set forth, and the scope of my invention will be indicated in the claims.

For a fuller understanding of the nature and objects of my invention, reference should be had to the following detailed description, taken in connection with the accompanying drawings.

BRIEF DESCRIPTION OF THE DRAWINGS

In the drawings:

FIG. 1 represents a pickup truck having a spare wheel and tire mounted on the right side wall of its box by means of a spare tire holder embodying my invention;

FIG. 2 is a fragmentary vertical sectional view of the pickup truck and the embodiment of my invention shown in FIG. 1, the plane of the section being indicated by the line 2—2 of FIG. 1;

FIG. 3 is a view in elevation of a spare tire holder embodying my invention, a wheel and tire mounted thereon being shown in phantom;

FIG. 4 is a fragmentary plan sectional view of the pickup truck and the embodiment of my invention shown in FIGS. 1 and 2, the plane of the section and the direction of viewing being indicated by the line 4—4 of FIG. 2 and the appended arrows;

FIG. 5 is a fragmentary plan sectional view of the pickup truck and the embodiment of my invention shown in FIGS. 1 and 2, the plane of the section and the direction of viewing being indicated by the line 5—5 of FIG. 2 and the appended arrows;

FIG. 6 is a fragmentary vertical view of a spare tire holder embodying my invention, particularly illustrating one of my alternative tire securing means;

FIG. 7 is an enlarged view in perspective of a fragmentary section of the embodiment of my invention shown in FIG. 6, the plane of the section and the direction of viewing being indicated by line 7—7 of FIG. 6 and the appended arrows;

FIG. 8 is an enlarged view in perspective of a fragmentary section of the embodiment of my invention shown in FIG. 6, the plane of the section and the direction of viewing being indicated by line 8—8 of FIG. 6 and the appended arrows; and FIG. 9 is a perspective view of an alternative embodiment of my invention, as mounted on a pickup truck of the Step-Side type (fragmentarily shown in phantom).

DESCRIPTION OF THE PREFERRED EMBODIMENTS

Referring now to the drawings, there is shown in FIG. 1 a pickup truck 10. Pickup truck 10 is provided, in the well known manner, with a box portion, generally designated by the reference numeral 12. Box portion 12 comprises upstanding right side wall 14, a corresponding upstanding left side wall (not shown), and a flat bed indicated by dashed line 16. The pickup truck 10 illustrated in FIG. 1 is of the well known type sometimes referred to by the term "Fleetside," in which the outside surfaces of the box side walls lie outwardly of the outer surfaces of the rear wheels, and thus the rear wheels are recessed within the box side walls, rather than being provided with outwardly projecting fenders. It is to be understood, however, that my invention is not limited in its application to pickup trucks of the "Fleetside" type. To the contrary, and in contrast with some devices of the prior art, my invention is also applicable to the older type of pickup truck, having projecting fenders, which is sometimes designated by the term "Step-Side," an embodiment of my invention adapted for mounting on "Step-Side" pickup trucks being shown in FIG. 9 and described hereinafter.

Returning to FIG. 1, there is shown a spare wheel 18 and tire 20 mounted on the right box side wall 14 of pickup truck 10 by means of a spare tire holder embodying my invention. Only the uppermost portion of the spine 24 and the hook means 28 for engaging the bottom of the right box side wall 14 are shown in FIG. 1, the same parts being shown in FIG. 2 as part of a complete embodiment.

In FIG. 1 the reference numeral 30 designates a second tire and wheel assembly (shown in phantom) which may be mounted on the box side wall 14, in addition to wheel 18 and tire 20, by means of a second spare tire holder of my invention identical to the spare tire holder of my invention used to mount wheel 18 and tire 20.

As may now be understood by reference to FIG. 1, spine 24 overlies but a small portion of the top wall of box side wall 14.

Phantom line 32 in FIG. 1 represents a camper of the well known type mounted in box 12 of the pickup truck 10.

Referring now to FIG. 2, it may be seen that the upper end of spine 24 (which is fabricated from steel or other suitable material capable of sustaining the weight of wheel 18 and tire 20 without substantial distortion) is bent or otherwise formed into sections 24', 24'', and 24''' which embrace box side wall rim 14' and constitute the fixed part of a clamp for clamping the upper portion of spine 24 to the top of box side wall 14. The complete clamp is generally referred to herein by the reference numeral 36. The adjustable part of clamp 36 includes bolts 38, 40, and 41 (see FIG. 4) which pass through holes (not shown) in section 24'' of spine 24; nuts 42, 44, and 45 (not shown), which are welded to section 24'' in registration with the holes through which bolts 38, 40, and 41 pass, and which interthreadedly receive bolts 38, 40, and 41; and a metal jaw plate 46 which prevents the ends of bolts 38, 40, and 41 from damaging the upper face of side wall rim 14'.

As will be evident from FIG. 2, spine 24 is clamped to rim 14' by engaging the jaw formed by sections 24', 24'', and 24''' with rim 14', threading bolts 38, 40, and 41 into nuts 42, 44, and 45, advancing these bolts partially toward the underside of section 24', inserting jaw plate 46, and then tightening bolts 38, 40, and 41 to firmly set jaw plate 26 against the underside of section 24'.

To prevent chafing of the exterior of box side wall 14 by the lower end of spine 24, spine 24 is provided with pad means generally designated by the reference numeral 50. Pad means 50 comprises bolts 52 and 53 (FIG. 5), the heads of which are encased in resilient material to avoid chafing side wall 14. Bolts 52 and 53 pass through holes (not shown) in the lower end section of spine 24, and are interthreaded with nuts 54 and 55 (FIG. 5) which are welded onto said section in registration with said holes. After setting bolts 52 and 53 so as to hold the central portion of spine 24 away from box side wall 14, bolts 52 and 53 may be locked in position by means of locking nuts 56 and 57 (FIG. 5).

In order to maintain spine 24 against swaying, e.g., when pickup truck 10 starts and stops, hook 28 is provided, which hooks under the lower edge or skirt of box side wall 14. Suitable tension means 60, such as nylon strap or an arrangement of rods and a turnbuckle, extends from the lower end of spine 24 to hook 28. Hook 28 is attached to tension means (belt) 60 in a manner well known to those having ordinary skill in the art, and is preferably adjustably affixed to spine 24 by being friction grippingly engaged with slots in spine 24 in the manner well known, for instance, for securing bicycle racks and the like to passenger automobiles. Alternative means of affixing tension means 60 to hook 28 and spine 24 will be provided by those having ordinary skill in the art without the exercise of invention.

As may be seen by comparison of FIGS. 2 and 3, wheel securing means are provided, by means of which a variety of different wheel types may conveniently be secured to spine 24. The wheel securing means are generally designated by reference numeral 64.

Wheel securing means 64 includes a bolt 66 which is welded in position in a hole through the central part of spine 24, thus providing an outwardly projecting threaded stud upon which a wheel and tire can conveniently be hung while being secured to spine 24. A plurality of nuts 70, 72, 74, 76 are welded to the inside of spine 24, in registration with suitable holes, for receiving mounting bolt 80. As best seen in FIG. 3, nuts 70, 72, 74, and 76 are so located that each registers with one bolt hole of one type of wheel hung on threaded stud 66. Thus, when a wheel having five mounting bolt holes disposed in a five inch diameter bolt circle is hung on threaded stud 66 one of its bolt holes will register with nut 70, or nearly so, making it convenient to insert mounting bolt 80 and thread it into nut 70. After thus inserting and engaging bolt 80, nut 82 may be threaded onto stud 66, and both nut 82 and bolt 80 tightened, to secure the wheel and tire to spine 24. The other nuts 72, 74, and 76 similarly accommodate wheels of other sizes and styles.

An alternative wheel securing arrangement which constitutes a feature of my invention is shown in FIGS. 6 through 8. This feature of my invention comprises a bolt 83 which is welded into a hole in spine 24 and serves as a threaded wheel mounting stud in a manner analogous to that of bolt 66 in the embodiment of FIGS. 1 through 3. In this embodiment (FIGS. 6 through 8), however, the welded nuts 70, 72, 74, and 76 are replaced by two slots 84 and 86, and a sleeve 88 (FIG. 7) which can alternatively be mounted in one or the other of slots 84 and 86. As shown in FIG. 7, sleeve 88 is provided with internal threads 90 which are adapted to receive a tire mounting bolt corresponding to bolt 80 shown in FIG. 2. Sleeve 88 is also provided with an enlarged head 92 and external threads 94, whereby it can be positioned in either one of the slots 84, 86, and retained there by means of nut 96. Two flats 97 and 98 (only one shown) are provided at opposite sides of sleeve 88 to prevent it from turning while nut 96 is being tightened to retain sleeve 88 at a desired position in slot 84 or 86. To assist in positioning of sleeve 88 before tightening nut 96, graduations are provided along slots 84 and 86, as shown in FIG. 6. These graduations correspond to bolt circle diameter in inches.

The angle between slots 84 and 86 should be about 18¼ degrees, and the graduations indicate distance from the center of the threaded stud 83 (e.g., the 4-inch graduations, extended, intersect the center lines of the corresponding slots four inches from the center of threaded stud 83).

As may be seen from the legends on spine 24 shown in FIG. 6, nut 88 is located in slot 84 for mounting wheels having even numbers of mounting bolt holes, and is located in slot 86 for mounting wheels having odd numbers of mounting bolt holes. In securing a wheel and tire to the securing arrangement of FIGS. 6 through 8, sleeve 88 is first positioned in accordance with the bolt hole count and bolt circle diameter of the wheel to be mounted, as just discussed. The wheel is then hung on threaded stud 83, and a nut threaded loosely thereon. When the wheel is thus hung on threaded stud 83 one of its bolt holes will be in approximate alignment with the threaded bore of sleeve 88. A bolt is then inserted through the aligned hole and threaded into threads 90 of sleeve 88, whereafter the nut on threaded stud 83 and this bolt (engaged with threads 90) can be tightened, and the securing of the wheel and tire is completed.

It will be evident from comparison of FIGS. 3 and 6 that the wheel securing arrangement of FIGS. 6 through 8 is capable of accommodating an even wider range of truck wheel styles and sizes than the wheel securing arrangement of the embodiment of FIGS. 1 through 3.

Going now to FIG. 9 there is shown an embodiment of my invention adapted for use in connection with a "Step-Side" pickup truck. The spine of this embodiment is designated by the reference numeral 100, and has sections 100' and 100" corresponding to sections 24' and 24" of the spine 24 of the earlier described embodiment. These sections 100' and 100" closely adjoin the top wall 101 of the pickup truck box, and thus, like sections 24' and 24" of spine 24, present the minimum interference with the mounting of a camper in the box of the pickup truck. The adjustable parts of the clamping arrangement of this embodiment, generally designated by the reference numeral 102, are two bolts which engage with nuts welded to the spine 100 and can be set up to bear against the box side wall immediately under rim 101. Clamping means 102, may be seen to be located entirely outside the pickup truck box, and thus does not interfere with the mounting of a camper in the box.

Pads 104 and 106, analogous to the pad means of FIG. 2, are provided at the lower end of spine 100. In accordance with a particular feature of this embodiment (FIG. 9) short pad bolts 104, 106 may be used when the spare tire holder is to be mounted over the fender portion of the box side wall of a "Step-Side" pickup truck, or long pad bolts 104', 106' may be used when the spare tire holder of this embodiment is to be mounted on the flat portion of the box side wall of a "Step-Side" pickup truck.

It will thus be seen that the objects set forth above, among those made apparent from the preceding description, are efficiently attained, and, since certain changes may be made in the above constructions without departing from the scope of my invention, it is intended that all matter contained in the above description or shown in the accompanying drawings shall be interpreted as illustrative only, and not in a limiting sense.

Thus, for instance, it may be desired to eliminate the adjustable part of the clamping means of the spines, depending instead upon the downward force provided by the tension means to maintain the hook sections at the upper end of the spine in engagement with the top of pickup truck side walls, and such constructions fall within the scope of my invention.

Further, I have discovered that in some embodiments the tension means (e.g., strap 60, etc.) may be eliminated, and such alternative constructions also fall within the scope of my invention.

It is also to be understood that the following claims are intended to cover all of the generic and specific features of my invention, and all statements of the scope of my invention which, as a matter of language, might be said to fall therebetween.

Having described my invention, what I claim as new and desire to secure by Letters Patent is:

1. A spare tire holder for a pickup truck having a box portion including upstanding side walls which have an integral top wall, comprising
   an elongated spine capable of bearing the weight of a truck wheel and tire, the maximum horizontal and vertical dimensions of said spine lying parallel to said side walls when said spine is mounted on said truck being less than the outside diameter of said truck wheel and tire;
   adjustable wheel securing means for securing truck wheels of various dimensions to said spine;
   clamping means positioned beneath the top wall for clamping the upper portion of said spine to the top wall of one of said side walls without altering said one of said side walls, the maximum horizontal dimension of said clamping means lying parallel to said side walls when said spine is mounted on said truck being less than the outside diameter of said truck wheel;
   adjustable pad means for preventing the chafing of said one of said side walls by said spine and permitting selective orientation of said spine;
   hook means for engaging the bottom of one of said side walls; and
   tension means extending between said hook means and the lower portion of said spine for maintaining said pad means in contact with said one of said side walls.

2. A spare tire holder as claimed in claim 1 in which said clamping means includes two flat, mutually perpendicular portions of said spine adapted to adjoin the top face and the inner face, respectively, of said one of said side walls when the spare tire holder is mounted on said one of said side walls, the remainder of said clamping means lying within the smaller dihedral angle formed by said two flat, mutually perpendicular portions of said spine.

3. A spare tire holder as claimed in claim 1 in which said wheel securing means comprises a threaded stud adapted to pass through one of the bolt holes of a truck wheel, and a plurality of internally threaded openings, each of said internally threaded openings being so located with respect to said threaded stud as to be able to receive a bolt passing through one of the bolt holes of a truck wheel which is pendulously disposed upon said threaded stud.

4. A spare tire holder as claimed in claim 2 in which said wheel securing means comprises a threaded stud adapted to pass through one of the bolt holes of a truck wheel, two slots passing through said spine, and an internally threaded sleeve passing through one of said slots and adapted to receive a bolt passing through one of the bolt holes of a truck wheel mounted upon said threaded stud, and in which the distance of said pads from said spine is adjustable, and said threaded sleeve is provided with at least one flat face which engages a wall of one of said slots to prevent said sleeve from rotating.

* * * * *